July 15, 1952 — J. D. KNIPPLE — 2,603,015
LICENSE PLATE HOLDER AND BRACKET
Filed Feb. 1, 1950
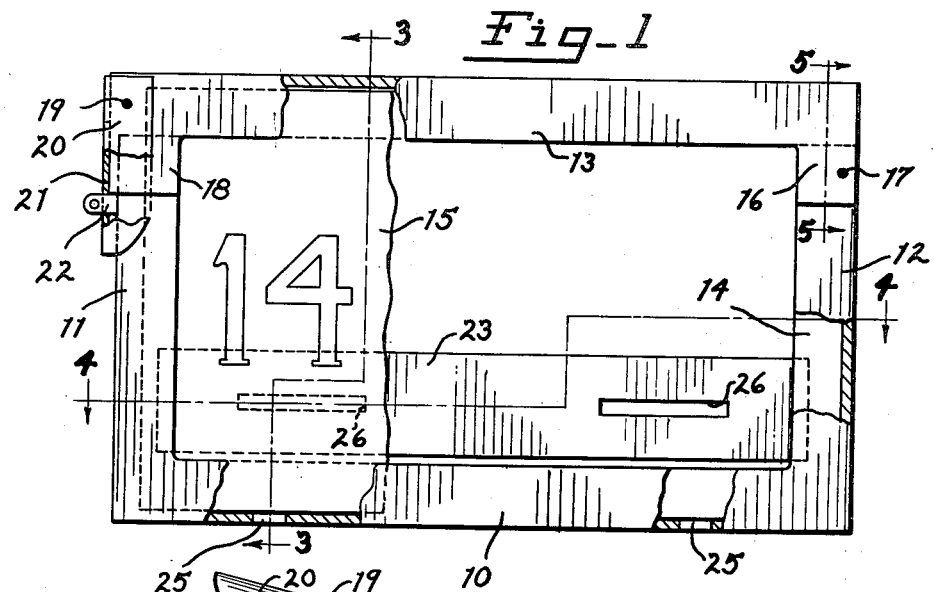
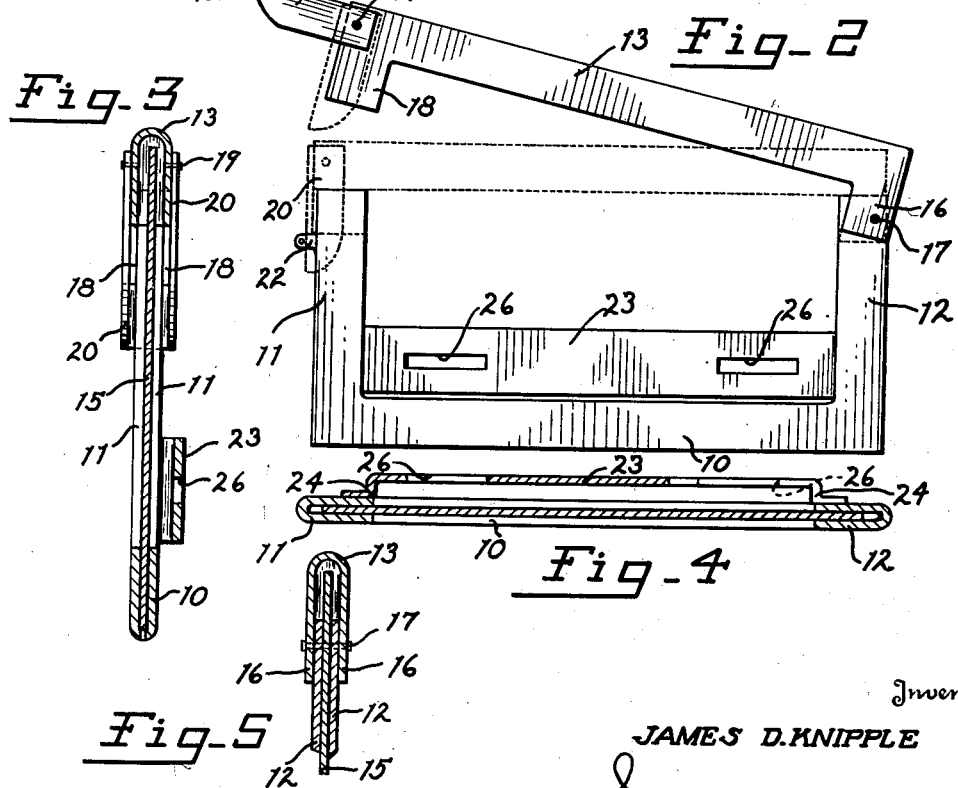
Inventor
JAMES D. KNIPPLE
By Harvey & O'Connell
Attorneys Patented July 15, 1952

2,603,015

UNITED STATES PATENT OFFICE 2,603,015

LICENSE PLATE HOLDER AND BRACKET

James D. Knipple, Johnstown, Pa.

Application February 1, 1950, Serial No. 141,756

1 Claim. (Cl. 40—125)

This invention relates to license plate holders for vehicles, and the general object of the invention is to generally improve upon holders of this class by providing one of comparatively simple construction yet at the same time one which will securely but removably retain the license plate in position against unauthorized removal.

A specific object of the invention is to provide a license plate holder and bracket so combined that the same may be permanently mounted on the vehicle and yet will permit ready removal of the license plate for substitution purposes as from time to time is generally required.

The license plate holder of this invention is characterized by being in the form of a substantially rectangular frame structure having one of the frame members thereof pivoted to facilitate insertion and removal of the license plate, and equipped for cooperation with a second one of the frame members to accommodate a cotter pin or lock, as may be desired, whereby the license plate after insertion, is securely mounted within the frame so as to require the deforming of either the holder or the license plate in order to remove the latter, without authority, from the holder.

The invention, together with its objects and advantages, will be best understood when the following detailed description thereof is read with reference to the accompanying drawing, in which is illustrated what is presently considered a preferred embodiment of the invention, and wherein:

Figure 1 is a front elevational view, with portions broken away, and other portions shown in section, of a license plate holder and bracket embodying the features of this invention;

Figure 2 is a front elevational view of the license plate holder, the license plate being removed and the pivoted frame member of the holder being shown by dotted lines in a completely bridging position closing the frame, and by full lines in a partially open or non-bridging position;

Figure 3 is a vertical transverse sectional view taken substantially on the line 3—3 of Figure 1;

Figure 4 is a horizontal sectional view taken substantially on the line 4—4 of Figure 1, and Figure 5 is a fragmentary detail sectional view taken substantially on the line 5—5 of Figure 1.

Referring now more in detail to the drawings, it will be seen that the license plate holder of this invention comprises a substantially rectangular frame composed of a bottom longitudinal member 10, end or vertical members 11, 12 and a top longitudinal member 13.

The members 10, 11 and 12 are preferably formed from a single blank of metal bent longitudinally into substantial channel shape in cross section, and then bent intermediate its ends to provide the aforementioned members 10, 11 and 12, with each of the members presenting an internal channel 14 for the reception of an edge of the license plate fragmentarily illustrated and indicated by the reference numeral 15.

The frame member 13 is also formed from a single length of metal bent longitudinally so as to provide the member 13 with an internal channel for receiving the upper edge of the license plate. Member 13 is also formed at one end thereof with spaced parallel extensions 16 that are apertured and adapted to straddle the free end of one of the end members, in the present instance end member 12. Through the medium of the extensions 16 and suitable rivets or other elements 17, frame member 13 is pivoted to the aforementioned frame member 12.

At its free or opposite end frame member 13 is similarly formed with extensions 18 that are adapted to straddle the free end of the other end frame member, in this instance frame member 11.

To the free end of the frame member 13 there is pivoted, as at 19, the bifurcated end of a relatively short channel shaped member or hasp 20. The hasp 20 is adapted to straddle the frame member 11 when the frame is in the fully closed position shown in Figure 1. The web or closed side of the channel shaped hasp 20 is provided with an aperture 21 that is adapted to receive an apertured lug 22 projecting from the frame member 11 and adapted to accommodate in the aperture thereof a cotter pin, padlock or any other suitable form of locking device, not shown, for securing the frame in fully closed position and against unauthorized opening thereof.

The license plate holder, as just described, is provided with an attaching bracket 23. Bracket 23 is in the form of a single length of metal and is disposed at the rear or back of the frame. The end portions of bracket 23 are offset and then extended longitudinally as indicated generally at 24, and at the ends 24 thereof the bracket is welded or otherwise secured to the frame members 11 and 12.

Bracket 23 may be permanently mounted together with the frame on a suitable part of the vehicle or may be removably mounted thereon. For the latter purpose bracket 23 is provided with slots 26 to accommodate attaching bolts or such other fastening means as may be employed for securing the bracket to the desired fixed part of the vehicle.

From the foregoing it will be seen that when the frame member 13 is swung to a fully open position, that is, out of bridging position with respect to the frame members 11 and 12, the license plate 15 may be readily inserted in the frame with the bottom edge thereof being received in the channel of frame member 10 and the end edges thereof received in the channels of the frame members 11 and 12. With the license plate so positioned in the frame, frame member 13 is then swung to the dotted line position of Figure 2, the upper edge of the license plate being accommodated by the channel of the frame member 13. After the frame has been closed about the tag 15 in the manner just indicated, hasp 20 is swung down into the full line position shown in Figure 1 and the dotted line position shown in Figure 2, lug 22 passing through the aperture 21 as the hasp moves into position straddling frame member 11. A cotter pin, padlock or other locking instrumentality is then engaged with the apertured projecting end of lug 22 for securely locking the plate 15 within the holder against dislodgment.

It will also be apparent that with the frame locked in the manner suggested, unauthorized removal of the license plate from the holder will require either the rupturing of the frame or distortion of the license plate. This is advantageous in that by reason of merely observing the distorted or broken condition of the holder one will readily recognize the fact that the license plate has been unauthoritatively removed therefrom.

It will also be understood that in actual practice an interlining of rubber or other suitable material for the channels of the frame members may be employed to hold the license plate firmly in position and against rattling. Also, and as shown, the bottom frame member 10 is preferably apertured to provide drain openings 25 for draining off rain and splashed water thus preventing freezing of the plate within the holder.

While the invention has been described in detail in its presently preferred embodiment, it will, of course, be understood that such has been done for purposes of illustration only and not by way of limitation, and therefore only such limitations are to be imposed thereon as may reasonably come within the scope of the appended claim.

What I claim is:

A license plate holder comprising a substantially rectangular frame structure embodying a bottom longitudinal member and end members integral therewith, said bottom longitudinal member and end members being formed from a single blank of material bent longitudinally to provide channels for the reception of the edge portions of a license plate, the rectangular frame also including an upper longitudinal member formed of a single length of material bent longitudinally to provide a channel for the reception of the upper edge of the license plate, each end of the upper longitudinal member including spaced parallel extensions which straddle the upper terminals of said end members, the extensions at one end being pivoted to its end member, a channel-shaped hasp pivoted to the opposite end of the upper longitudinal member for engagement over the extensions at said opposite end and the proximate end member of the frame, said hasp having an aperture therein, and an aperture lug on said opposite end to extend through the aperture in the hasp.

JAMES D. KNIPPLE.

REFERENCES CITED

The following references are of record in the file of this patent:

UNITED STATES PATENTS

| Number | Name | Date |
| --- | --- | --- |
| 709,466 | Butt | Sept. 25, 1902 |
| 1,381,038 | Walshe | June 7, 1921 |
| 1,699,191 | Holmers | Jan. 15, 1929 |
| 1,829,824 | Forrester | Nov. 3, 1931 |
| 1,839,816 | Viverett | Jan. 5, 1932 |
| 1,995,984 | Hudson | Mar. 26, 1935 |